(12) United States Patent
Adley

(10) Patent No.: US 6,278,583 B1
(45) Date of Patent: Aug. 21, 2001

(54) LOW IMPEDANCE HEAD/PREAMPLIFIER CHIP POSITION IN A DISK DRIVE

(75) Inventor: James M. Adley, Hutchinson, MN (US)

(73) Assignee: Questek Innovations, Inc., Waconia, MN (US)

( * ) Notice: Subject to any disclaimer, the term of this patent is extended or adjusted under 35 U.S.C. 154(b) by 0 days.

(21) Appl. No.: 09/412,487

(22) Filed: Oct. 5, 1999

Related U.S. Application Data

(63) Continuation-in-part of application No. 08/962,476, filed on Oct. 31, 1997, now Pat. No. 5,956,211.

(51) Int. Cl.[7] .................................................. G11B 5/55
(52) U.S. Cl. ................................. 360/244.1; 360/245.8
(58) Field of Search .............................. 360/234.5, 244.1, 360/244.2, 245.8, 246, 265.9

(56) References Cited

U.S. PATENT DOCUMENTS

| | | | |
|---|---|---|---|
| 4,789,914 | * 12/1988 | Ainslie et al. | 360/103 |
| 4,891,723 | * 1/1990 | Zak | 360/106 |
| 5,168,185 | * 12/1992 | Umehara et al. | 310/15 |
| 5,245,489 | * 9/1993 | Kimura et al. | 360/104 |
| 5,283,704 | * 2/1994 | Reidenbach | 360/104 |
| 5,384,675 | * 1/1995 | Crawforth et al. | 360/75 |
| 5,465,186 | * 11/1995 | Bajorek et al. | 360/113 |
| 5,560,097 | * 10/1996 | Bajhorek et al. | 29/603.12 |
| 5,729,399 | * 3/1998 | Albrecht et al. | 360/75 |
| 5,805,382 | * 9/1998 | Lee et al. | 360/104 |
| 5,978,178 | * 11/1999 | Adley | 360/104 |
| 6,025,988 | * 2/2000 | Yan | 361/685 |
| 6,084,746 | * 7/2000 | Shiraishi et al. | 360/104 |
| 6,091,578 | * 7/2000 | Stole et al. | 360/106 |

FOREIGN PATENT DOCUMENTS

| | | |
|---|---|---|
| 11-185233 | * 7/1999 | (JP) . |
| 11-191211 | * 7/1999 | (JP) . |
| 11-224402 | * 8/1999 | (JP) . |

\* cited by examiner

*Primary Examiner*—Jefferson Evans
(74) *Attorney, Agent, or Firm*—Schwegman, Lundberg, Woessner & Kluth, P.A.

(57) ABSTRACT

A disk drive system includes a base, a disk rotatably attached to the base, and an actuator assembly pivotally attached to the base. The actuator assembly moves the transducer to selected areas of the disk where information representative of data is to be written or read. The actuator assembly maintains the transducer in a transducing relationship with the disk. The actuator assembly includes an arm and a head gimbal assembly. The head gimbal assembly includes a suspension. The arm has a length from the point where it pivots to the end of the arm. The arm and suspension can be thought of as having a fixed length for a certain sized disk drive. The length of the arm is greater than 4.0 times the length of the suspension. The ratio of the length of the arm to the length of the suspension is in the range of 4.0 to 20.0. The arm is made of a material with a stiffness-to-mass ratio in the range of 6.0 to 20.0×10[6] m. The resulting actuator arm is long and stable and the suspension is short so that the signal processing preamplifier chip attached to the arm near the end carrying the transducer is 8 mm or less from the head transducer. The material of the arm conducts heat away from the chip by moving it from the preamplifier chip to the surface of the arm in the airstream between the disk and the arm. The suspension includes signal-carrying wires which electrically connect the transducer to the preamplifier chip which have a length in the range of 4 mm to 12 mm.

18 Claims, 8 Drawing Sheets

LOW IMPEDANCE HEAD/PREAMPLIFIER CHIP POSITION IN A DISK DRIVE

This application is a continuation-in-part of U.S. patent application Ser. No. 08/962,476, filed Oct. 31, 1997, now U.S. Pat. No. 5,956,211.

FIELD OF THE INVENTION

The present invention relates to the field of mass storage devices called disk drives. More particularly, this invention describes a unique design of an actuator arm and a suspension for placing an electronics chip in close proximity to the head transducer.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in transducing relationship with the disk. The transducer can be used to read information representing data from the disk or write information representing data to the disk. When the disk is operating, the disk is usually spinning at a relatively high RPM. These days common rotational speeds are 5100 and 7200 RPM. Rotational speeds of 10,000 RPM and higher are contemplated for the future. At such speeds, the very small ceramic block flies on a very thin layer of gas or air. In operation, the distance between the small ceramic block and the disk is very small. Currently "fly" heights are about 0.0003 mm. In some disk drives, the ceramic block does not fly on a cushion of air but rather passes through a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is either divided, such as sectors, or grouped together on the tracks. In some disk drives, the tracks are a multiplicity of concentric circular tracks. In other disk drives, a continuous spiral is one track on one side of a disk drive. Servo feedback information is used to accurately locate the transducer with respect to a track. The actuator assembly is moved to the required position and held very accurately during a read or write operation using the servo information.

The electrical leads for both data and control signals from the head transducer are generally routed to the head transducer on the surface of the suspension and on the surface of the arm to a flex cable at the base of the arm. The signals are then routed to a preamplifier chip located either on the disk drive electronics card or on the flex cable. The electrical frequency response of the circuit, including the head transducer, the preamplifier and the electrical connection between the two determines the observed sharpness of the magnetic transitions on the disk. The sharper the observation (higher frequency response), the closer the bits can be placed together and still be discretely observed or recorded. Thus, the frequency response of the circuit, including the head transducer, the preamplifier and the electrical connection between the two, is a key factor in determining the bits per inch that can be placed on the media disk. The frequency response of the circuit including the transducer head, the preamplifier and the interconnect will be a limiting factor on the linear density as linear densities (number of bits per inch (BPI)) gets in the range of 300 KBPI to 600 KBPI.

The actuator assembly is composed of many parts that contribute to the performance required to accurately hold the read/write head in the proper position. There are two general types of actuator assemblies, a linear actuator and a rotary actuator. The rotary actuator includes a pivot assembly, an arm, a voice coil yoke assembly and a head gimbal suspension assembly. The rotary actuator assembly pivots or rotates to reposition the transducer head over particular tracks on a disk. A suspension or load beam is part of the head gimbal suspension assembly. The rotary actuator assembly also includes a main body which includes a shaft and bearing about which the rotary actuator assembly pivots. Attached to the main body are one or more arms. One or typically two head gimbal suspension assemblies are attached to the arm. Currently in most head gimbal suspension assemblies, the length of the arm is approximately equal to the length of the suspension. The length of the arm and the length of the suspension determine, in part, the mechanical resonance frequency of the actuator assembly.

One end of the suspension is attached to the actuator arm. The transducer head, also known as a read/write head, is found attached to the other end of the suspension. One end of the actuator arm is coupled to a pivot assembly. The pivot assembly is in turn connected to a voice coil motor attached to a voice coil yoke on the main body of the actuator assembly. The other end of the actuator arm is attached to the head gimbal suspension assembly. The head gimbal suspension assembly includes a gimbal to allow the read/write head to pitch and roll and follow the topography of the imperfect memory disk surface. The head gimbal assembly also restricts motion with respect to the radial and circumferential directions of the memory disk. The suspension assembly is coupled to the actuator arm as part of the main body of the actuator assembly which holds the pivot support and is coupled to the voice coil motor. Currently, the pivot assembly is mounted within an opening in the main body. When a number of arms are attached to the main body, a unitized E-block is formed. The E-block includes the arms for mounting the suspension on one end and a voice coil yoke for the voice coil motor on the other end.

U.S. Pat. No. 5,283,704 issued to Reidenbach illustrates another actuator system composed of individual components instead of the unitized E-block. This actuator system is "built up" from at least one individual actuator arm, spacer rings, a separate voice coil yoke frame assembly, and a separate bearing cartridge. A voice coil is located on the voice coil yoke. The voice coil and magnets attached to the housing of the disk drive form a voice coil motor. The disk drive includes a feedback control loop to enable accurate positioning of the transducer head. The disk drive system produces control signals sent to the voice coil motor to move the actuator arm and the suspension supporting the read/write head across the memory disk in a radial direction to the target track. The control signals indicate to the motor the magnitude and direction of the displacement. The control signals can also be used to maintain the position of the read/write head or transducer over a particular track.

These control and data signals are transmitted from the transducer head to the signal processing preamplifier chip. Currently, discrete wires from the transducer head to the actuator flex circuit or electrical traces fabricated on the suspension leading to the actuator flex (such as HTI, TSA products) or by small flex circuit assemblies that connect the head to the actuator flex (such as Innovex's FAST products) are used to form the interconnection. These interconnects have a characteristic impedance per length that interacts with the preamplifier chip and transducer head to determine the system frequency response. Lower interconnect impedance allows higher circuit frequency response and hence cleaner read signals.

To minimize noise and the inductance of the leads, the preamplifier and write-current sources are usually placed near the actuator arms. Wires or leads are typically strung over the surface of the actuator arm and pass to the preamplifier attached near the actuator arm. The wires are typically twisted in pairs to minimize cross talk between the wires. Cross talk results in noise in the wires. Such noise can produce inaccurate readback signals sent to the preamplifier. Minimizing noise from the preamplifier is critical since noise from the preamplifier will be amplified and may produce dominating noise in the amplifiers which follow in the circuitry of the data channel. Moving the preamplifier as close to the transducer as possible minimizes noise in the leads and minimizes the noise produced in the channel circuit. In addition, moving the chip closer to the transducer improves the frequency response of the head and the preamplifier circuit as a function of the lower interconnect impedance.

In the past, chips have been placed on the arms of disk drives with linear actuators where interdisk spacing, and the weight of the arm were not concerns see U.S. Pat. No. 4,891,723 issued to Brian Zak on Jan. 2, 1990. Placing the chip on the thin stainless steel arms or suspension load beams associated with today's disk drives with rotary actuators has significant difficulties. The preamplifier chip produces large amounts of heat. The heat produced cannot be dissipated by the thin, stainless steel actuator arm or suspension used in actuators of current disk drives. A chip could be placed on thick aluminum arms or E blocks to provide the arms with the ability to carry heat away from the chip. However, the benefit would be minimal since the head and transducer would still be 25 mm or more away from the preamplifier chip. Some current disk drive designs have the chip mounted in the flex cable attaching to the base of the arm, so moving the chip to the end of the arm using conventional arm and suspension lengths would also yield minimal benefit.

Actuator arms act as spring-mass-damper systems and have resonant frequencies that can degrade the performance of the servo system. Every closed loop servo motor system has a predetermined bandwidth in which mechanical resonances occurring within the bandwidth degrade the performance of the servo motor system. The actuator arm is one key source of unwanted mechanical resonances. Accordingly, the bandwidths of most servo motor systems are designed so that resonances of the actuator arm and suspension occur outside the bandwidth. Each actuator arm has a unique resonance characteristic. Current actuator arms are made of stainless steel, aluminum or magnesium. Suspensions are typically made of stainless steel.

The resonance characteristics of the arm has bending modes and torsion modes with frequencies that are within the same frequency range as the suspension and the magnetic storage disk (1 kHz to 8 kHz). Great care must be used when designing an actuator system to prevent alignment of resonance modes that would create very high gains and an unstable servo performance. Alignment of resonance modes means one component resonates at a frequency which is very near or the same as the resonant frequency of another component.

Stainless steel or aluminum arms could be made thicker to increase the bending and torsion mode frequencies, but the greater mass significantly degrades the performance of the actuator assembly by increasing the moment of inertia of the arm. Inertial increase will decrease the access time for moving the transducer between data tracks. One constant goal of disk drive design is to reduce access times. Yet another problem is the increase in the current requirements necessary to move the voice coil motor. Increased current results in increased heat within the disk enclosure and increased power requirements.

Use of a thicker steel will also result in other problems. For example, a higher mass assembly will cause significant degradation of shock resistance of the disk drive system. Higher mass assemblies also imply less stability in the form of head lift-off. When a large shock impulse in the vertical direction is applied to the actuator arm, the head gimbal assembly "lifts off" and slaps back on the disk surface. This head slap damages the surface of the disk.

Other metals such as aluminum have been used in making the arm, but the key parameter determining the resonance characteristics of a fixed geometry actuator arm is the stiffness-to-mass ratio of the material, which is about he same for aluminum and stainless steel. Of currently available materials that have been used as actuator arms, only beryllium alloys, ceramics, and carbon composites have significantly higher stiffness-to-mass ratios over that of currently used stainless steel or aluminum.

The demand for higher track density increases steadily as demand for increased storage capacity grows. As a result, increasing the performance of the actuator assembly by increasing the resonance frequencies of the arm, the suspension and the entire actuator assembly is a requirement for future systems. There is also a need for a disk drive system with lower access times. There is also a need for disk drives with actuator arms having a lower moment of inertia. There is still a further need for an arm that has a high stiffness-to-mass ratio such that the length of the arm can be extended to allow the placement of a preamplifier chip close to the read/write transducer.

There is also a need for faster data channels with less noise. Furthermore, there is a need for data channels with lower read error rates. There is also always a need for a more clear signal to increase the speed and reliability of the channel and increase the integrity and density of the data stored on the disk. If the signal is easier to read, the data retrieval process may be able to be conducted more quickly with less need for error correction codes and error correction procedures.

SUMMARY OF THE INVENTION

A disk drive system includes a base, a disk rotatably attached to the base, and an actuator assembly movably attached to the base. The actuator assembly moves the transducer to selected areas of the disk where information representative of data is to be written or read. The actuator assembly maintains the transducer in a transducing relationship with the disk. The actuator arm is made of a material having a stiffness-to-mass ratio (in the range of specific stiffness from 6.0 to 20.0 m×10$^6$) which is higher than arms made of currently used aluminum, magnesium or stainless steel (specific stiffness 2.45–2.59 m×10$^6$). The actuator assembly includes a suspension that may be made of stainless steel attached to the actuator arm. The suspension has a length less than ¼ times the length of the actuator arm and may be made of stainless steel. For example, in a 3.5 inch disk drive having a disk with a diameter of approximately 95 mm, the suspension has a length of 10 mm or less. In a 2.5 inch disk drive having a disk with a diameter of approximately 65 mm, the suspension has a length of 8 mm or less. The actuator arm can be made of any material having a stiffness-to-mass ratio in the range of 6.0 to 20.0 m×10$^6$, much greater than currently used stainless steel, aluminum or magnesium. The stiffness-to-mass ratio is also known as the specific stiffness of a material. The material of the arm has a specific stiffness of 6.0×10$^6$ m or greater. Such materials include composites with stiffening fibers, ceramics and beryllium alloys.

The suspension is made of stainless steel. When the actuator arm is made of a very light stiff material with specific stiffness in the range of 7.0 to 23 m×10$^6$, then the natural resonance frequencies of the arm are higher than those made of conventional aluminum, stainless steel, or magnesium. The material of the actuator arm may be a ceramic composite material, a fiber composite arm, or beryllium alloys. The arm may include stiffening fibers in one layer, several layers or even wrapped around a ceramic core. Such a present art actuator arm made of material or constructed to have a specific stiffness in the range of 6.0 to 20.0 m×10$^6$ resonates at much higher frequencies than presently used aluminum or magnesium. Using these high stiffness materials will uniquely allow extending the length of the actuator arm over current art. Extending the length of the actuator arm will lower the resonance frequency of the high stiffness arm, yet will keep the resonance frequency of the arm higher than shorter arms of currently used materials. Shorter suspensions inherently have higher resonance frequencies even when made of the same material. If other parameters of the suspension (thickness, etc.) remain constant, shortening the suspension increases the resonant frequency of the suspension, so the combined frequency of the arm and suspension assembly will thus increase.

With an arm or actuator made of high stiffness material, the length of the actuator arm can be increased such that it still resonates at higher frequencies than shorter arms made of low stiffness material. By increasing the length of the actuator arm and decreasing the length of the suspension, the resonance frequency of the entire arm/suspension assembly is increased. This can uniquely be accomplished only by using a high stiffness material for the actuator arm such that the optimum ratio of the length of the actuator arm to the length of the suspension is 4.0 to 20.0. The sum of the arm and the suspension lengths can be thought of as having a fixed length for a certain disk drive size. The length of the arm made of the high stiffness-to-mass material, is then extended and the length of the suspension shortened to form a higher resonance actuator of the same overall length and able to provide a unique location for a preamplifier chip.

The invention teaches an extended actuator arm made of a unique set of materials that allows the preamplifier chip to be attached to the arm. In addition, a long arm and short suspension are used and taught. This places the preamplifier chip in close proximity to the transducer within the slider. The slider and transducer may also be called the head. Placing the preamplifier function near the read/write transducer increases the head signal frequency response of the transducer/chip/interconnect system by reducing the interconnect inductance, resistance, and capacitance. The short leads from the head to the preamplifier provide a lower impedance and less noise pickup than previous wiring schemes. The mounting of the chip on a long arm made possible by light, stiff materials to within 4 mm of the head transducer results in substantial circuit frequency improvement. As the lead length approaches zero, only the head and preamplifier electrical characteristics determine the frequency response Future data storage will require much higher frequency chip/head designs so that the interconnect electrical performance will become more critical in the future.

Head/write chips generate considerable amounts of heat, particularly when writing data. Unlike conventional suspensions made of stainless steel and approximately 0.0025" thick, the arm is usually 0.030" or greater in thickness made of beryllium alloys, carbon fiber, or composite ceramics and can provide the necessary thermal conduction to cool a chip or die mounted onto the arm. Actuator arms made of ceramic materials, such as Dow Chemical, Midland, Mich., AlB$_4$C cermet, can also conduct and dissipate heat from a preamplifier chip attached to the actuator arm. The materials thus used to form the long, light, stiff actuator arms not only allow placement of a chip close to the head and transducer, but can be designed to safely conduct the heat away from the chip.

Advantageously, by lengthening the arm made of a material having a higher stiffness-to-mass ratio than currently used materials, an actuator arm/suspension assembly that resonates at higher mechanical resonant frequency which is outside the operating range of the current actuator/arm assemblies is formed. The actuator arm/suspension allows for greater track density and increased performance since it does not resonate in the operating range of the servo control bandwidth. More closely spaced tracks can be followed and lower access times are also achievable with this system. Advantageously, the resulting actuator arm has the preamplifier mounted very closely to the transducer and the slider carrying the head. As a result, the signal produced has less noise and also features a higher signal frequency response allowing higher bit/inch recording. The material of the arm is capable of conducting heat away from the chip much faster than chips mounted on suspensions.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
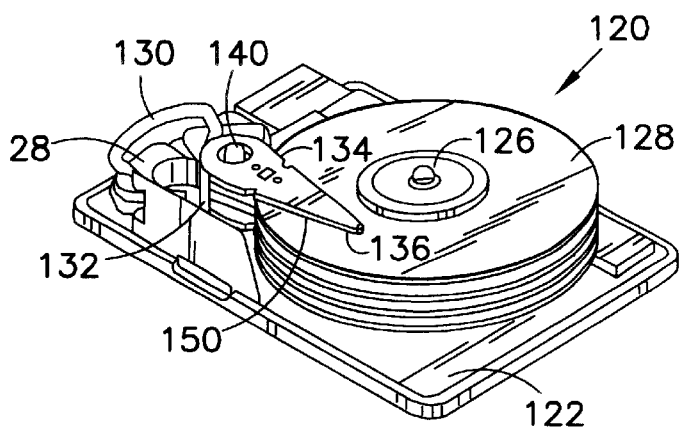
FIG. 1 is an isometric view of a disk drive having a rotating disk, an actuator, and an arm made of a composite material.
Figure 2:
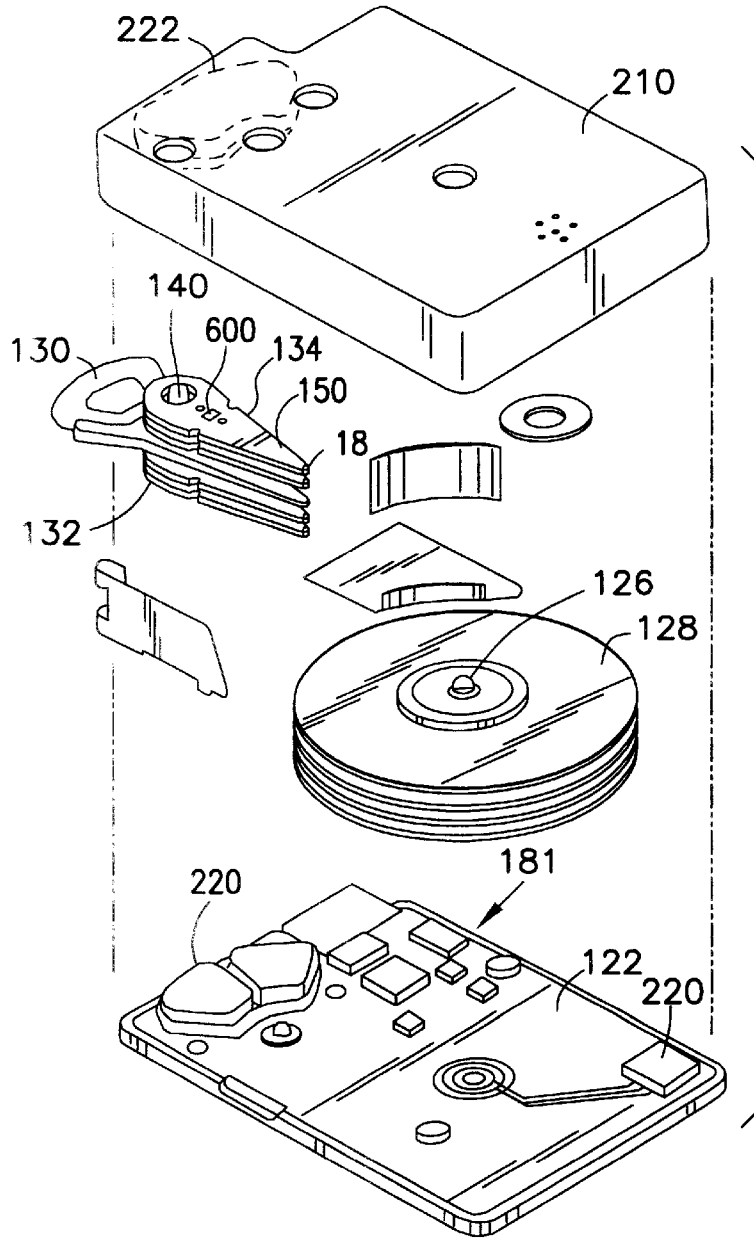
FIG. 2 is an exploded isometric view of a disk drive having a rotating disk, an actuator, and an arm made of a composite material.

Referring to FIGS. 1 and 2, the principal electrical and mechanical components of a disk drive constructed in accordance with a preferred embodiment of the present invention are illustrated. The disk drive includes a head/disk assembly ("HDA") 120 which includes a base 122 and a cover 210 (shown in FIG. 2). Attached to the base 122 is a spindle with an attached hub 126. Attached to the spindle with an attached hub 126 is a disk 128. Also attached to the base is a spindle motor for rotating the spindle with an attached hub 126 and the disk 128. Spindle motor driver circuitry 220 controls the current passing through the spindle motor to produce a torque and controllably rotate the hub and disk 128 attached to the spindle. An actuator assembly 132 is also attached to the base 122. The actuator assembly 132 includes arms 134 and suspensions 150 which carry transducers 136 in transducing relation to the disk 128. The arms 134 are attached to a pivot apparatus, such as a bearing cartridge 140. Attached to the arms 134 are the suspensions 150. The suspension carries transducers 136 which are encapsulated within or supported by a slider or small ceramic block. Interconnect wires 160 or other suitable means are used to connect the head to the electronics chip 181. The arm 134 includes a portion of the electronics chip 181 which is the preamplifier chip 600. The preamplifier chip 600 is the first stage of the electronic processing. The preamplifier chip 600 conditions the signal read by the transducer 136 for further processing.

The other end of the actuator assembly 132 includes a portion of an actuator motor 130. The portion of the actuator motor shown attached to the actuator assembly 132 is the voice coil. The actuator motor, formed of the voice coil and magnets 220 and 222 (shown in phantom), is used to actuate the assembly 132 and more specifically the transducers 136, also commonly referred to as read/write heads, to different radial positions relative to one or more surfaces of the disk 128.

Figure 3A:
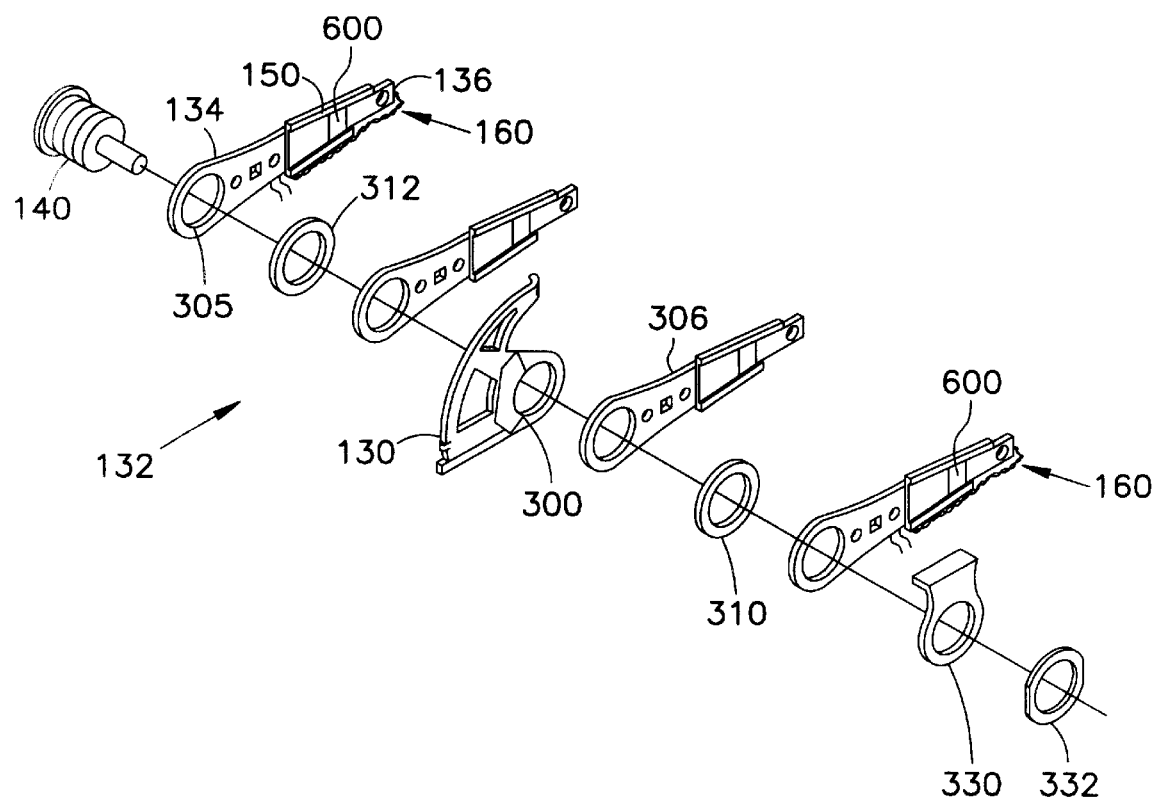
FIG. 3A is an exploded isometric view of an actuator assembly.

FIG. 3A is an exploded isometric view of an actuator assembly 132. The actuator assembly 132 includes a number of arms 134 having suspensions 150 attached to each of the arms. Attached to each of the suspensions 150 is a transducer 136. Attached to the transducer are wires 160 leading back from the head to the base of the actuator. Although four arms are shown in FIG. 3, only one is labeled with reference numerals since they are all substantially identical. The arm 134 has an opening 305 therein. The opening 305 fits over the outside diameter of the bearing cartridge 140. Several spacers 310 and 312 are also included in the actuator assembly 132. The spacers 310 and 312 space adjacent arms 134 away from each other such that the arms can pass between the disks 128. The actuator assembly 132 also includes a yoke 300 which holds the voice coil 130 of the voice coil motor. The yoke includes an opening 303 which also fits over the bearing cartridge 140. Also included are several retainers 330 and 332. The retainers 330 and 332 fit over the top of the bearing cartridge and maintain the actuator assembly 132 in an assembled position. The yoke 300 also serves as a spacer. During assembly, an arm 134 is formed and a suspension 150 is attached to one end of the arm 134. The suspension 150 typically carries the transducer 136. The transducer 136 is connected via wires 160 or other interconnect system to the preamplifier 600. An actuator flex cable or other electrical interconnect.

The first arm 134 is placed over the bearing cartridge such that the transducer faces upwardly or can read the bottom surface of one of the disks 128. A spacer 312 is then placed atop the first arm, a subsequent arm is then added to the bearing cartridge. The yoke 300 is then added as are another arm, another spacer 310 and a final arm. The entire assembly is held in place by the retainers 330 and 332. The actuator assembly 132 is usually assembled in a jig which includes an alignment mechanism and all arm wiring is connected to the actuator flex cable. Each of the arms 134 includes an opening which can receive a rod or other withdrawable tool that can be used for alignment of the various components of the actuator assembly 132.

Figure 3B:
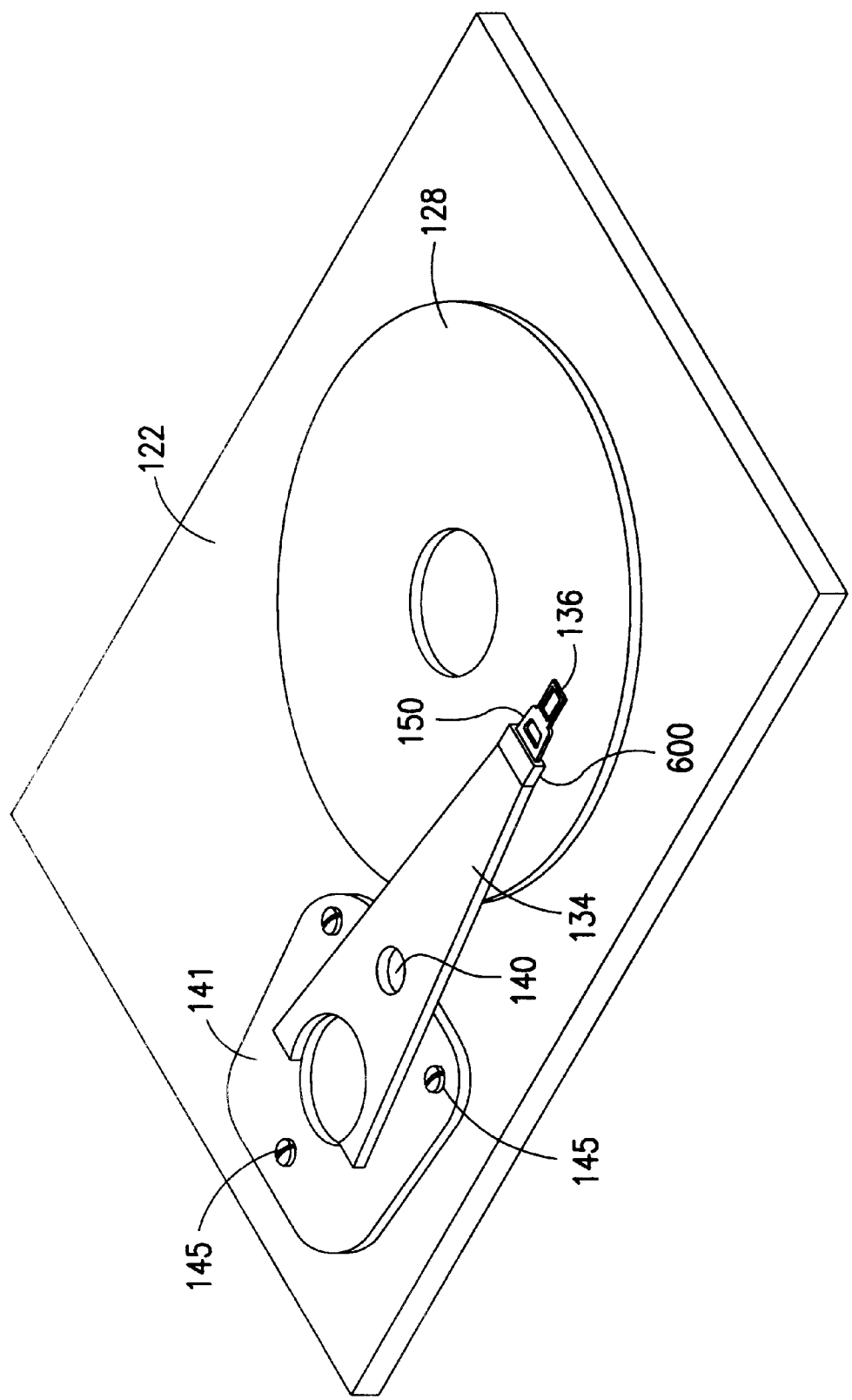
FIG. 3B is a single arm actuator assembly.

An alternative actuator assembly is shown in FIG. 3B. Actuator assembly 132 consists of one arm only. Yoke 300 which holds voice coil 130 is fabricated as part of arm 134. Bearing cartridge 140 on which the arm is pivoted is mounted to adjusting plate 141. Adjusting devices 145 can be used to set the force of transducer 136 against disk 128.

Figure 4A:
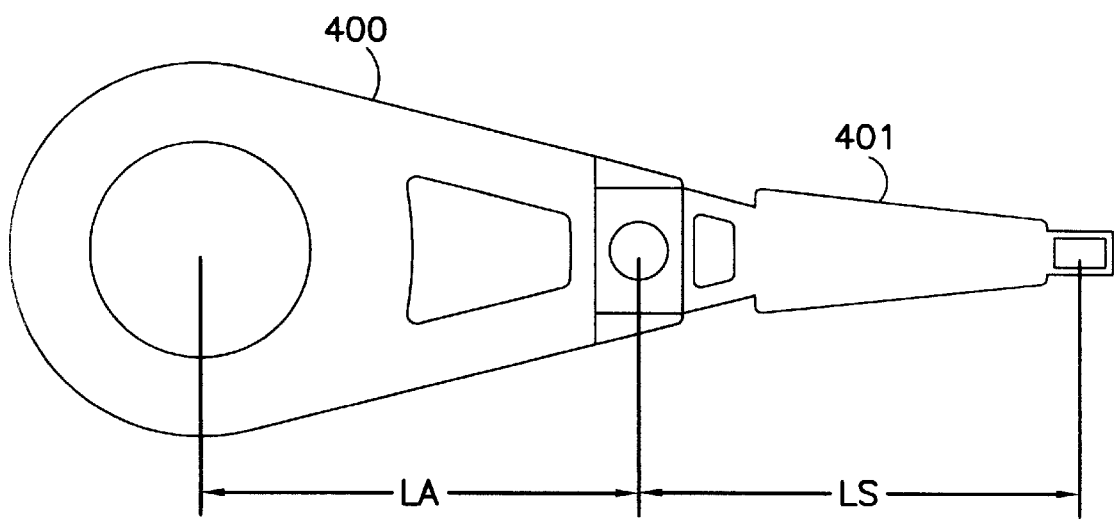
FIG. 4A is a top view of an actuator arm used in the prior art.

FIG. 4A is a top view of a prior art arm 400 and suspension 401 arrangement. The length of the arm 400, designated LA, is approximately equal to the length of the suspension 401, designated LS. The ratio of the length of the arm 400 to the length of the suspension 401 is therefore approximately 1:1 to 2:1.

Figure 4B:
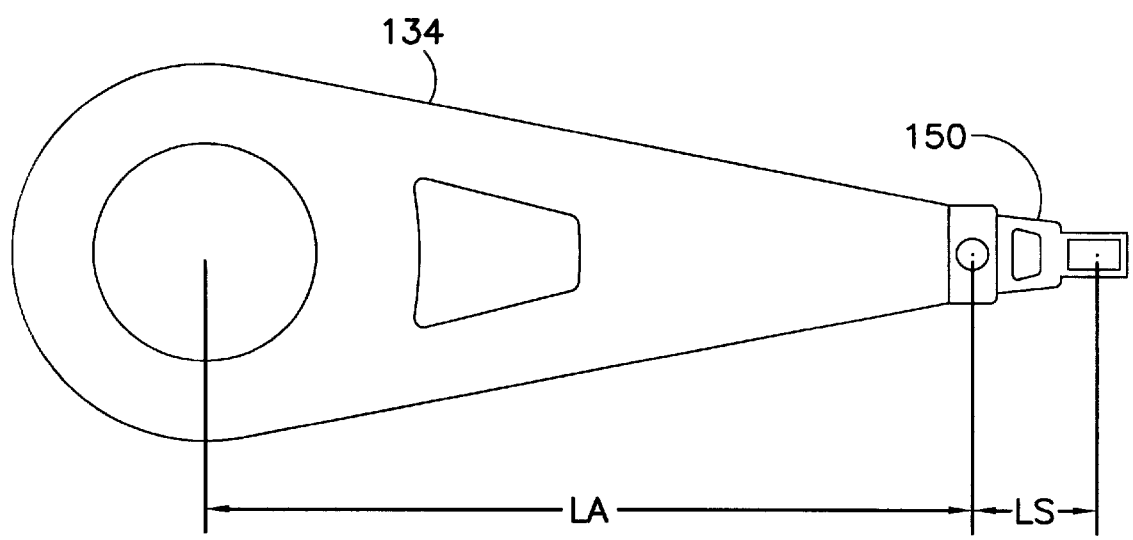
FIG. 4B is a top view of an actuator arm used in this invention.

FIG. 4B is a top view of the arm 134 and suspension 150 of this invention. The arm 134 is made of a material having a stiffness-to-mass ratio of 6.0 to 20.0 m $\times 10^6$, much higher than magnesium, aluminum or steel.

As can be seen from the arms 134 shown in FIGS. 3B and 4B, the arm 134 is long and the suspension is short in relation to the arm. The ratio of the arm length to the suspension is in the range of 4.0 to 20.0. In addition, the preamplifier 600 is attached very closely to the end of the elongated arm 134. This places the preamplifier 600 very close to the transducing head 136. Placing the preamplifier 600 close to the transducing head 136 shortens the length of the electrical conductor 160 between the transducer head 136 and the preamplifier. The shortened distance lessens noise in the signal.

The arm 134, as discussed in U.S. patent application Ser. No. 08/912,874 filed on Aug. 15, 1997 and incorporated herein by reference, can be made of a composite material having one or more layers of material which include elongated stiffening fibers, ceramics, ceramic composites, or beryllium or beryllium alloy. The length of the arm 134, designated LA in FIG. 4B, is considerably longer than the length of the suspension 150, designated LS in FIG. 4B. The optimum ratio (LA:LS) for a very light stiff arm of the length of the arm 134 to the length of the suspension 150 ranges from 4.0:1 to 20:1. The ratio of the length of the arm 134 to the length of the suspension 150 preferably falls within a range of 5.0:1 to 12:1.

The length of the arm 134 is longer than current art since it has higher stiffness-to-mass ratio than the materials previously used to make the arm. In other words, the arm can be extended since the material used to build the arm 134 is stiffer for a given mass. The material has a specific stiffness in the range of 6.0 to 20.0 m×$10^6$. As a result, extending the length of the arm 134 serves to shorten the suspension 150 so that the entire arm/suspension assembly mechanically resonates at higher frequencies outside the range of operation of the servo bandwidth of the actuator assembly as it does seek operations in a disk drive.

Figure 5:
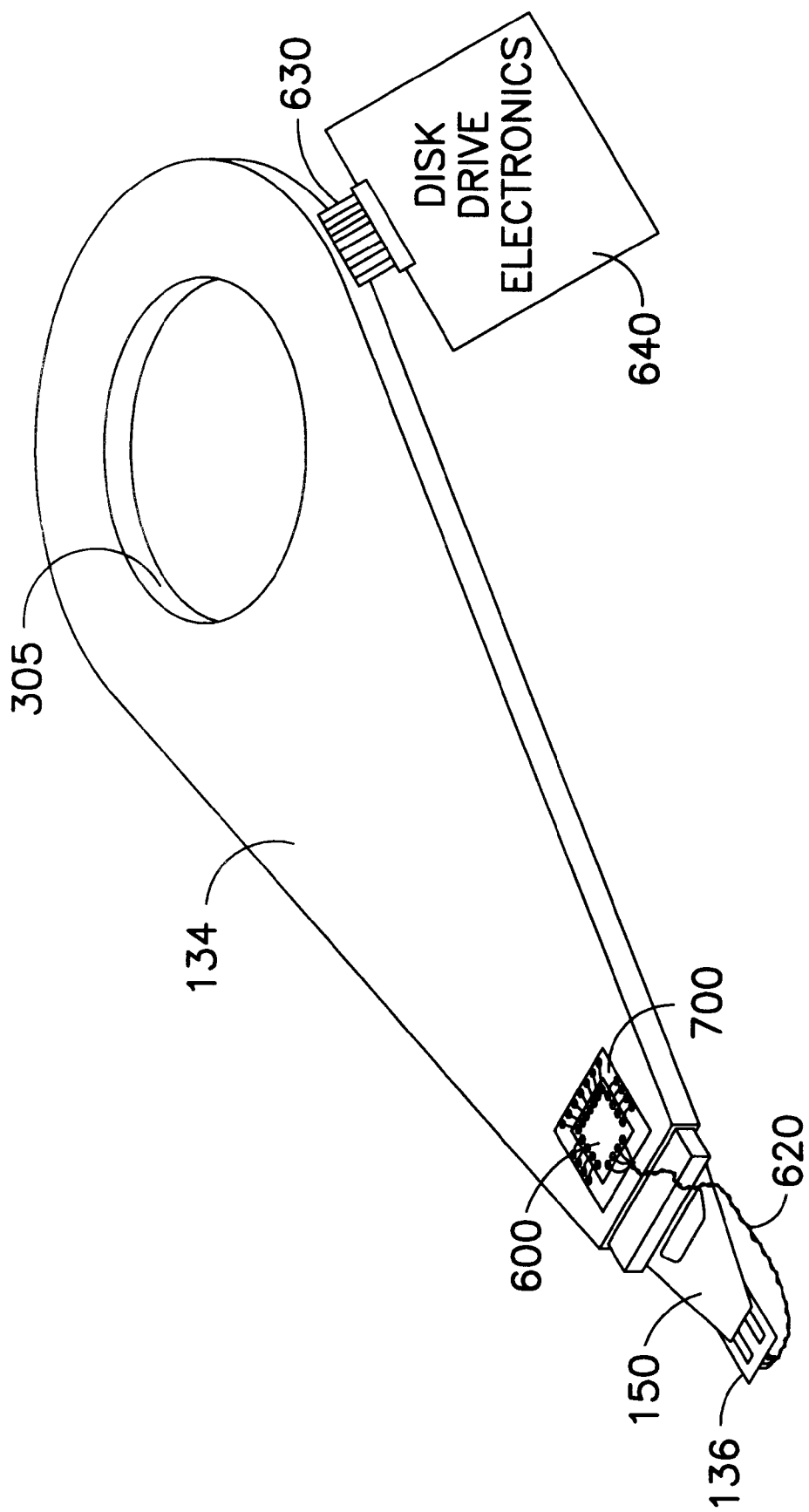
FIG. 5 is a chip on a long actuator arm.

FIG. 5 shows an elongated arm 134 made of a stiff material capable of dissipating or conducting heat away from a preamplifier. The material must be able to conduct 0.2 watt to 1.2 watts from a preamplifier 600. The light, stiff arm 134 allows a unique new configuration of the read/write head and the preamplifier chip.

Referring to FIG. 5, the elongated light, stiff arm 134 is made of a fiber composite, ceramic, or beryllium, and allows the use of a short suspension 150 to maintain the read/write head or transducer 136 on the recording media disk. FIG. 5 shows a preamplifier 600 on an elongated arm 134. A single channel preamplifier chip 600 is mounted near the suspension attachment end of the long actuator arm 134 shown in FIG. 5. The preamplifier chip 600 is not packaged. The chip is the actual chip or die. The arm 134 is used as the packaging for the chip 600. The chip or die can have a series of pads to which the wires bond. The chip 600 can also be a flip-chip mounted with solder balls on the outer perimeter of the chip. Other techniques such as a ball grid array or pin grid array can be used. The arm 134 includes a mating connector or set of pads. The chip or die 600 is positioned and then bonded to the arm 134. A flex circuit or direct wire electrical attachment 700 is used to connect the power supply, control, and data electrical line inputs to the chip 600. For purposes of illustration, the chip 600 shown has pads to which leads attach. Short wire leads 620 or attached electrical interconnects from the head 136 are bonded to the chip output pads as required for either inductive or magnetoresistive ("MR") heads. The wires 620 from the transducer 136 are routed either over or along side of the head flexure region in as short a route as possible to the preamplifier chip 600. Two signal carrying wires are required for thin-film inductive heads and 4 or 5 signal carrying wires are required for MR or giant magnetoresistive ("GMR") heads.

The signal carrying wires from the transducing head 620 are wire bonded to the pads on the chip or die 600 mounted directly on the arm 134. Alternatively, any other means to electrically connect the head to its associated circuitry could be used to connect to the chip on the arm. One such way to electrically connect the head and associated circuitry is the TSA™ product made by HTI of Hutchinson, Minn. The short electrical interconnect between the short suspension and head transducer provides reduced impedance regardless of the interconnect technology used. The short electrical interconnect may be even more advantageous when using technologies other than wires. In addition, the automation used to connect the wires 620, or other interconnection can be used with the chip 600 or without the chip, facilitating an efficient manufacturing process. In addition, the wires or flex circuit 700 carry the signals between the chip 600 near the swage hole 306 and an electrical connector 630 near the pivot end of the arm 134. The electrical connector 630 connects to the disk drive electronics 181, shown in schematic form in FIG. 5.

The arm material conducts the heat away from the chip, particularly during the write operation. The heat is conducted into the arm 134 and dissipated along the length of the arm 134 or conducted to the base casting 122. A ceramic or ceramic composite arm can conduct the heat away from the chip 600 and into the airstream, moving over the arm 134, as well as a beryllium or beryllium alloy arm. Considerable heat can be dissipated by the arm 134 because of the large surface area of the long actuator arm 134 and high air flow rate associated with the disk media rotation. The actuator arm 134 has a thermal mass and thermal conductance capabilities to dissipate the heat produced by the chip 600. Thin stainless steel suspensions do not have the capability to conduct a sufficient amount of heat laterally away from the chip.

Figure 6:
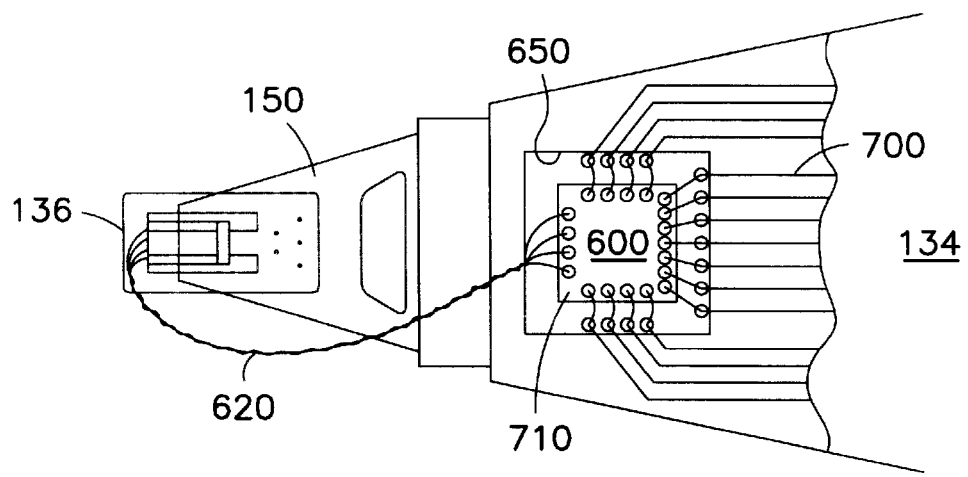
FIG. 6 is a bottom view of an arm mounted chip.
Figure 7:
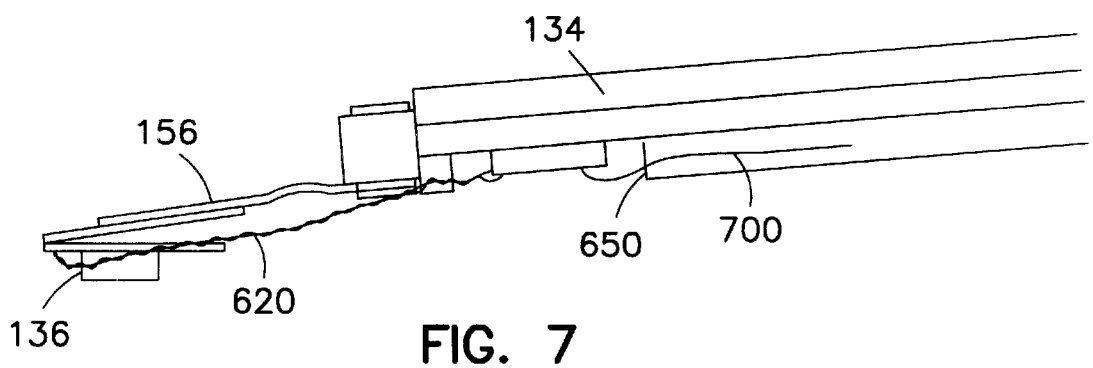
FIG. 7 is a side view of an arm mounted chip.
Figure 8:
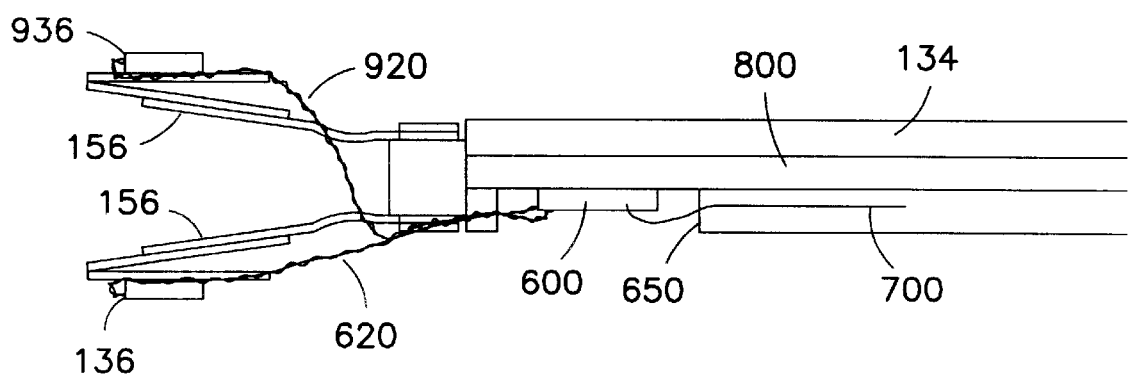
FIG. 8 is a side view of an arm having two heads and suspensions and one preamplifier chip.
Figure 9:
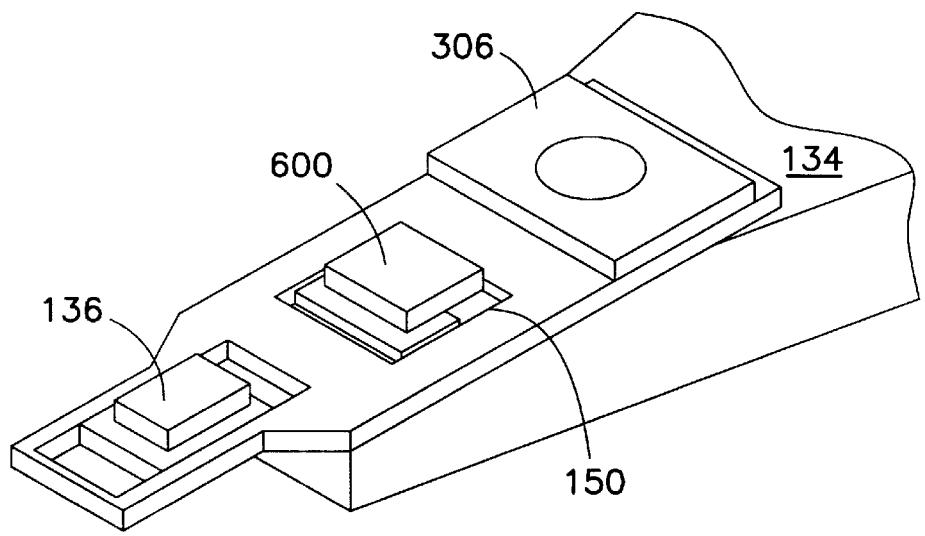
FIG. 9 is an isometric view of the chip mounted on the suspension over the arm.

As shown in FIGS. 6 and 7, the actuator arm 134 may have an opening or pocket 650 therein. FIG. 7 shows a top view of an arm with a pocket while FIG. 8 shows a cutaway view of the elongated arm 134 having the pocket. The pocket 650 is dimensioned so that it will receive the chip 600 and a lead frame or other chip connecting device. Another option is to embed the chip 600 into the arm 134. The chip 600 can be partially or wholly embedded within the arm 134. Embedding the chip 600 either partially or wholly within the arm 134 provides for an advantage in that the wires 700 (shown in FIG. 7) do not move with relation to the chip 600. Therefore, the connection points or pads 710 are not stressed by relative motion between the wires 700 and the chip 600. This provides for a much more reliable connection between the wires 700 and the chip 600 and, therefore, provides for a much more reliable arm. Embedding the wires 700 in the arm 134 is also advantageous in that when the arm 134 is formed of a composite material, the carbon layers used are electrically conductive and hence can shield against electromagnetic fields. The embedded wires 700 are, therefore, wrapped in layers of carbon and are not subject to stray noise or cross talk between the various wires. For assembly purposes, the signal processing chip 600 can be mounted on the suspension in a portion of the suspension which is in direct thermal contact to the arm 134 as shown in FIG. 9. The chip must be located such that the heat from the chip is conducted vertically through the suspension material into the arm.

FIGS. 6 and 7 show a bottom view and a side view of the arm 134 carrying a chip 600 near the transducer 136. The wires 700 are shown embedded within the arm 134. As shown in FIGS. 7 and 8, the chip 600 may fit within a pocket 650. The pocket 650 is dimensioned so that the chip 600 (as well as the lead frame 610) can fit within the pocket 650. The chip 600, the transducer 136, the wires 620 and wires 700, as well as the connector 630 and disk drive electronics 640, all form part of a data channel which is used to either write data to a disk or read data from a disk. The chip 600 is typically a preamplifier which preamplifies the signals from the transducer during the read operation. Signal processing chip 600 may also provide D to A conversion and microactuator processor support as well as other signal processing functions. A preamplifier, such as the chip 600, can be set up to receive one channel or the information from one surface of a disk, or the preamplifier chip 600 can be set up to receive two or more channels from two or more transducers 136. A multi-channel chip 600 which could receive and amplify the data from two data surfaces and two transducers 136 would be advantageous when the arm 136 is going to be inserted between two disks of a disk drive. In the event of the arm 134 being inserted between two disks, the two transducers 136 will read two separate surfaces. Therefore, each transducer 136 would have a set of wires 620 which attach to the preamplifier chip 600. The preamplifier 600 would determine which channel is being read and would send the appropriate signals down the wires 700 to the rest of the data channel after processing by the chip 600.

FIG. 8 shows a side view of an arm 134 which includes a first transducer 136 and a second transducer 936. The second transducer 936 is carried by, or attached to, suspension 956. Suspension 956 is attached to the arm 134 at one end and carries the transducer 936 at the other. A set of signal-carrying wires 920 is attached to the head or transducer 936 at one end and attached to the chip 600 at the other end. The signal-carrying wires 920 pass through openings in the suspension 956 and suspension 156 and are then routed along the arm to the chip 600 within the arm 134. Several more wires 700 may be imbedded within the arm 134 and the actuator apparatus. One of the additional wires 700 allows selection of signals from either the transducer 936 or the transducer 136 when they are reading or writing to or from a respective disk surface. The enable line will allow selection of signals to or from one of these transducers. The preamplifier chip 600 or die fits within the pocket 650 of the arm 134. It should be noted that the chip 600 is not within a traditional package but is the actual die. The chip 600 is then placed within the arm 134 which can be thought of as replacing the normal packaging.

It should also be noted that any arm 134 made of a material with a stiffness-to-mass ratio in the range of 6.0 to $20.0 \times 10^6$ m, could be used to make an extended arm that improves the resonance characteristics of the actuator assembly 132 and allows placement of a chip near the head transducer. Other composite structures, metal/ceramic or other materials, such as $AlB_4C$ made by Dow Chemical, pure beryllium, or any ceramic material such as SiC, SiN, AlN, etc. could be used as arm materials. Likewise, design structures of any material that achieve a high specific stiffness by design, such as a monocoque or hexagonal unit, could also be used to form an extended actuator arm of high stiffness-to-mass ratio.

The resonant frequencies of the arm and the suspension are both a function of their length. The length of the arm and the length of the suspension are chosen in concert to optimize the system performance. The resonant frequencies must be balanced so that the net result is the highest frequency arm/suspension combination resonance modes possible. A material having a higher stiffness-to-mass ratio allows for a longer arm length that resonates at a higher frequency. Using materials with a specific stiffness in the range of 7.0 to 23 $m \times 10^6$, the arm can be elongated and still have a resonance at a frequency which is higher than a shorter arm of stainless steel, aluminum, or magnesium. Since the arm and suspension combination is a fixed length in a particular disk drive design, the elongation of the arm means that the length of the suspension will be shortened. The shortening of the suspension will also increase the resonant frequency of the suspension so that the combined resonance of the arm/suspension will be higher than previously possible. The resonant frequency can be optimized in this high region and provide a unique placement position for the preamplifier chip.

FIG. 9 shows an alternate embodiment of this invention. In the alternate embodiment, the preamplifier chip 600 is mounted on the suspension 150 directly over arm 134. As a result, heat from the preamplifier chip 600 travels vertically into the arm material such that heat flow from the chip takes place in the vertical direction through the portion of the suspension holding chip 600 and to the arm 134. Vertical heat flow through the suspension into the arm over the area of the chip will allow the arm 134 to continue to dissipate the heat produced by the chip. This allows the preamplifier chip 600 to be attached to the suspension which is typically a poor conductor of heat. The preamplifier 600 is in thermal communication or thermal contact with the actuator arm 134. The preamplifier 600 can dissipate heat through the suspension and to the arm 134. The arm 134 material is selected for its ability to conduct heat as well as for its specific stiffness. Since the suspension is a poor conductor of heat in the horizontal direction, it cannot carry heat any distance to the arm.

The actuator arm is made of a material having a stiffness-to-mass ratio (in the range of specific stiffness from 6.0 to $20.0 \, m \times 10^6$) which is higher than arms made of currently used aluminum, magnesium or stainless steel (specific stiffness $2.45–2.59 \, m \times 10^6$). The actuator assembly includes a suspension that may be made of stainless steel attached to the actuator arm. The suspension has a length less than ¼ times the length of the actuator arm and may be made of stainless steel. For example, in a 3.5 inch disk drive having a disk with a diameter of approximately 95 mm, the suspension has a length of 10 mm or less. In a 2.5 inch disk drive having a disk with a diameter of approximately 65 mm, the suspension has a length of 8 mm or less. The actuator arm can be made of any material having a stiffness-to-mass ratio in the range of 6.0 to $20.0 \, m \times 10^6$, much greater than currently used stainless steel, aluminum or magnesium. The stiffness-to-mass ratio is also known as the specific stiffness of a material. The material of the arm has a specific stiffness of $6.0 \times 10^6$ m or greater. Such materials include composites with stiffening fibers, ceramics and beryllium alloys.

The suspension is made of stainless steel. When the actuator arm is made of a very light stiff material with specific stiffness in the range of 7.0 to 23 $m \times 10^6$, then the natural resonance frequencies of the arm are higher than those made of conventional aluminum, stainless steel, or magnesium. The material of the actuator arm may be a ceramic composite material, a fiber composite arm, or beryllium alloys. The arm may include stiffening fibers in one layer, several layers or even wrapped around a ceramic core. Such a present art actuator arm made of material or constructed to have a specific stiffness in the range of 6.0 to 20.0 $m \times 10^6$ resonates at much higher frequencies than presently used aluminum or magnesium. Using these high stiffness materials will uniquely allow extending the length of the actuator arm over current art. Extending the length of the actuator arm will lower the resonance frequency of the high stiffness arm, yet will keep the resonance frequency of the arm higher than shorter arms of currently used materials. Shorter suspensions inherently have higher resonance frequencies even when made of the same material. If other parameters of the suspension, such as thickness, etc., remain constant, shortening the suspension increases the resonant frequency of the suspension, so the combined frequency of the arm and suspension assembly will thus increase.

With an arm or actuator made of high stiffness material, the length of the actuator arm can be increased such that it still resonates at higher frequencies than shorter arms made of low stiffness material. By increasing the length of the actuator arm and decreasing the length of the suspension, the resonance frequency of the entire arm/suspension assembly is increased. This can uniquely be accomplished only by using a high stiffness material for the actuator arm such that the optimum ratio of the length of the actuator arm to the length of the suspension is 4.0 to 20.0. The sum of the arm and the suspension lengths can be thought of as having a fixed length for a certain disk drive size. The length of the arm made of the high stiffness-to-mass material, is then extended and the length of the suspension shortened to form a higher resonance actuator of the same overall length and able to provide a unique location for a preamplifier chip.

The invention teaches an extended actuator arm made of a unique set of materials that allows the preamplifier chip to be directly attached to the arm. In addition, a long arm and short suspension are used and taught. This places the preamplifier chip in close proximity to the transducer within the slider. The slider and transducer may also be called the head. Placing the preamplifier function near the read/write transducer increases the head signal frequency response of the transducer/chip/interconnect system by reducing the interconnect inductance, resistance, and capacitance. The short leads from the head to the preamplifier provide a lower impedance and less noise pickup than previous wiring schemes. The mounting of the chip on a long arm made possible by light, stiff materials to within 4 mm of the head transducer results in substantial circuit frequency improvement. As the lead length approaches zero, only the head and preamplifier electrical characteristics determine the frequency response Future data storage will require much higher frequency chip/head designs so that the interconnect electrical performance will become more critical in the future.

Read/write chips generate considerable amounts of heat, particularly when writing data. Unlike conventional suspensions made of stainless steel and approximately 0.0025" thick, the arm is usually 0.030" or greater in thickness made of beryllium alloys, carbon fiber, or composite ceramics and can provide the necessary thermal conduction to cool a chip or die mounted directly onto the arm. Actuator arms made of ceramic materials, such as Dow Chemical, Midland, Mich., AlB$_4$C cermet, can also conduct and dissipate heat from a preamplifier chip attached to the actuator arm. The materials thus used to form the long, light, stiff actuator arms not only allow placement of a chip close to the head and transducer, but can be designed to safely conduct the heat away from the chip.

Advantageously, by lengthening the arm made of a material having a higher stiffness-to-mass ratio than currently used materials, an actuator arm/suspension assembly that resonates at higher mechanical resonant frequency which is outside the operating range of the current actuator/arm assemblies is formed. The actuator arm/suspension allows for greater track density and increased performance since it does not resonate in the operating range of the servo control bandwidth. More closely spaced tracks can be followed and lower access times are also achievable with this system. Advantageously, the resulting actuator arm has the preamplifier mounted very closely to the transducer and the slider carrying the head. As a result, the signal produced has less noise and also features a higher signal frequency response allowing higher bit/inch recording. The material of the arm is capable of conducting heat away from the chip much faster than chips mounted on suspensions.

Advantageously, the resulting long actuator arm has the preamplifier mounted very closely to the transducer and the slider carrying the head. Basically, as the preamplifier is moved or placed in a closer proximity to the transducer, the interconnect impedance goes down and the frequency response of the data channel comprising the preamplifier chip 600, the short lead wires 620 and the transducer 136 will go up. As higher and higher data rates are achieved and desired, it will be necessary to have all portions of the data channel operating at high frequencies. As a result, the signal produced from the close proximity of the head and preamplifier chip has less noise and also features a higher frequency response. The material of the long arm is capable of conducting heat away from the preamplifier chip. The chip and the signal-carrying wires can also be placed or embedded in the arm to prevent relative motion and reduce stray signal pickup in the signal-carrying leads. An additional advantage is that the longer actuator arm coupled with the short suspension has increased shock resistance. The increased shock resistance yields a more robust drive.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disk drive comprising:
   an actuator arm having a pivot end, and a suspension attachment end;
   a suspension attached to the suspension attachment end of the actuator arm;
   a transducer attached to the suspension;
   a chip attached to said actuator arm near the suspension attachment end, said chip for processing the signal; and
   a plurality of signal carrying wires electrically coupling the chip attached to the arm and the transducer, said plurality of signal carrying wires having a length between 3 mm and 12 mm to minimize noise induced in said plurality of signal carrying wires.

2. The disk drive of claim 1 wherein the actuator arm made from a material having a specific stiffness in the range of $6.0 \times 10^6$ to $20.0 \times 10^6$ m.

3. The disk drive of claim 2 wherein the arm is formed of a composite including carbon fibers.

4. The disk drive of claim 2 wherein the arm is formed from ceramic.

5. The disk drive of claim 1 wherein the chip attached for processing the signal amplifies the signal as part of the processing.

6. The disk drive of claim 1 wherein the chip for processing signals produces heat in the range of 0.2 watt to 1.2 watts of heat, wherein the thermal characteristic of the actuator arm allows heat to be dissipated from the chip thermally attached to the actuator arm.

7. The disk drive of claim 6 wherein the arm is formed of a composite including carbon fibers.

8. The disk drive of claim 6 wherein the arm is formed from ceramic.

9. The disk drive of claim 1 wherein the suspension has a length less than ¼ times the length of the actuator arm.

10. The disk drive of claim 1 wherein said plurality of signal carrying wires has a length between 3 mm and 12 mm.

11. A disk drive comprising:
    a base;
    a disk rotatably attached to said base; and
    an actuator assembly rotatably attached to said base, said actuator assembly further comprising:
    an actuator arm having a pivot end, and a suspension attachment end;
    a suspension attached to the suspension attachment end of the actuator arm, said suspension having a chip attachment end;

a transducer attached to the suspension;

a chip attached to said actuator arm near the suspension attachment end, said chip for processing the signal; and a plurality of signal carrying wires electrically coupling the chip attached to the arm and the transducer, said plurality of signal carrying wires having a length between 3 mm and 12 mm to minimize noise induced in said plurality of signal carrying wires.

12. The disk drive of claim 11 wherein the length of the actuator arm of the actuator assembly is greater than 4.0 to 20.0 times the length of the suspension.

13. The disk drive of claim 11 wherein the length of the actuator arm of the actuator assembly is greater than 5.0 to 12.0 times the length of the suspension.

14. The disk drive of claim 11 wherein the arm of the actuator assembly is made of a material including ceramic.

15. The disk drive of claim 11 wherein the arm of the actuator assembly is made of a material including beryllium.

16. The disk drive of claim 11 wherein the actuator arm made from a material having a specific stiffness in the range of $6.0 \times 10^6$ to $20.0 \times 10^6$.

17. The disk drive of claim 11 wherein the chip for amplifying signals produces heat in the range of 0.2 watt to 1.2 watts of heat, wherein the thermal characteristic of the actuator arm allows heat to be dissipated from the chip attached to the actuator arm.

18. A disk drive comprising:

an actuator arm having a first end and a second end;

means for moving the actuator arm attached to the first end;

a suspension attached proximate the second end of the actuator arm;

a transducer attached to the suspension, the transducer producing or receiving a signal;

a chip attached to the suspension such that the suspension is in thermal contact with the actuator arm, said chip for amplifying or processing the signal; and a plurality of signal carrying wires electrically coupling the chip thermally attached to the arm and the transducer, said plurality of signal carrying wires having a length between 3 mm and 12 mm to minimize noise induced in said plurality of signal carrying wires.

* * * * *